July 27, 1926.
J. TANNENBAUM
1,593,887
EXTENSIBLE CUFF LINK
Filed Jan. 26, 1925
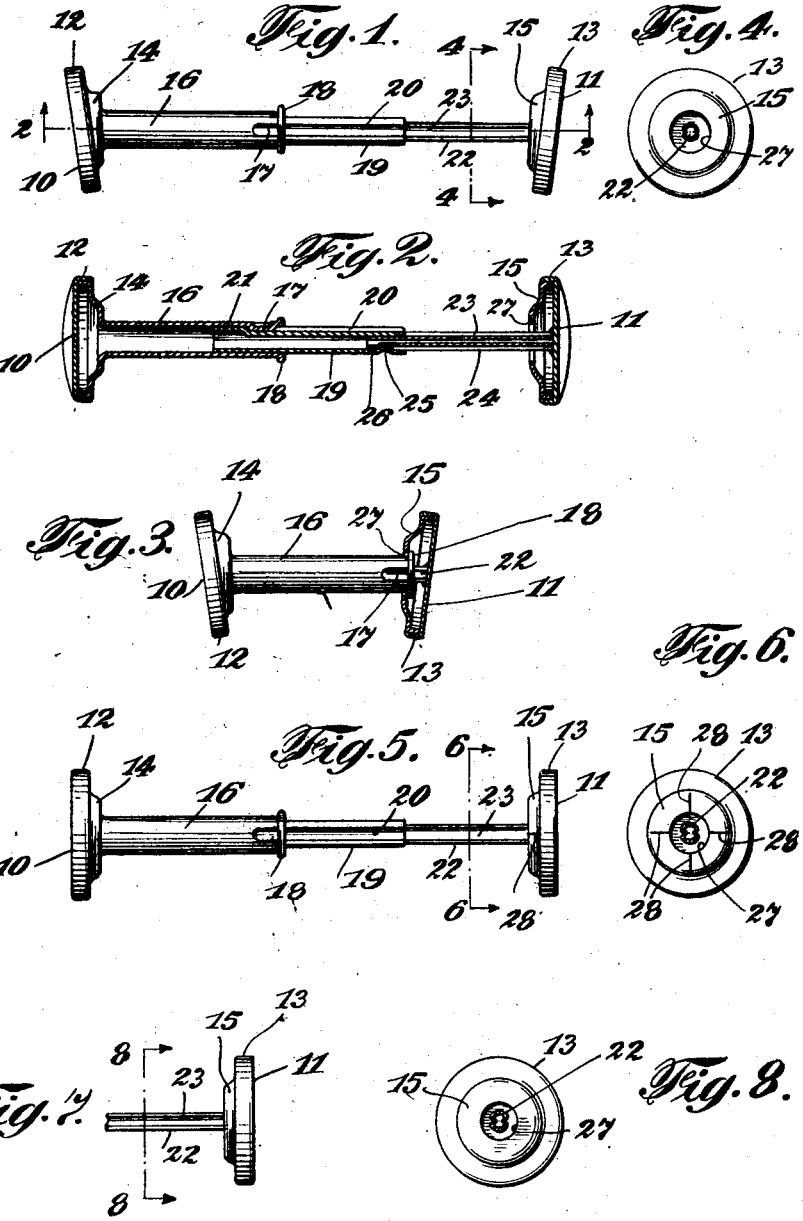

Patented July 27, 1926.

1,593,887

UNITED STATES PATENT OFFICE.

JOSEPH TANNENBAUM, OF NEW YORK, N. Y., ASSIGNOR TO ANNA DAVIS, OF NEW YORK, N. Y.

EXTENSIBLE CUFF LINK.

Application filed January 26, 1925. Serial No. 4,907.

My invention relates to cuff-links and refers particularly to extensible cuff-links.

The value of extensible cuff-links and their improved usefulness and adaptability over non-extensible links and separable links are well known.

A cuff-link of this character should be strong in construction, simple in operation, capable of considerable extension with a minimum of size, readily and firmly locked in retracted position and easily unlocked and extended.

The device of my invention possesses these and other valuable attributes, which are evident upon a consideration of the accompanying drawings and the explanations thereof.

In the accompanying drawings, illustrating modified forms of the device of my invention, similar parts are designated by similar numerals.

Figure 1 is a side view of one form of my device in extended position.

Figure 2 is a section through the line 2—2 of Figure 1.

Figure 3 is a side view of the device of Figure 1 in retracted position.

Figure 4 is a section through the line 4—4 of Figure 1.
Figure 5 is a side view of a modified form of my device.

Figure 6 is a section through the line 6—6 of Figure 5.

Figure 7 is a fragmental side view of a modified form of my device.

Figure 8 is a section through the line 8—8 of Figure 7.

The particular form of the device of my invention, shown in Figures 1 to 4 inclusive, comprises two link heads formed by the outward members 10 and 11, the annular sides 12 and 13 and the inner members 14 and 15, the heads thus formed being hollow. The member 14 is extended into the cylindrical shank 16 having an inset catch 17. The shank 16 is not at right angles to the face of the member 14. The extremity of the shank 16 forms an outwardly extended ring, or annular flange, 18.
Slidable within the shank 16 is a shank member 19 having a longitudinal recess 20 within which the catch 17 is movable and incapable of accidental removal therefrom because of the shoulder 21.

Slidable within the shank member 19 is a shank member 22 having a longitudinal recess 23 within which the recess 20 is slidable and also the recess 24 within which the inset catch member 25 of the shank member 19 is slidable but incapable of accidental removal therefrom because of the shoulder 26 of the member 22. The shank member 22 passes through an annular opening 27 of the inner head member 15 and is fixedly attached to the head member 11. The faces of the head members 14 and 15 are not in parallel plane but are positioned angularly with respect to each other and they are not at right angles to the telescopic shank members. The ring, or flange, 18 is of such size with respect to the opening 27 that when the head members are brought toward each other by telescoping the shank members the angular relationship between the telescopic shaft and the member 15 will allow the flange 18 to enter the opening 27. Because of this angular relationship, the ring 18 can be slightly larger than the opening 27, as the former enters the latter at an angle. The ring 18 within the chamber of the head acts as a removable binding element between the two heads thus preventing their accidental separation but allowing of this separation and extension of the telescopic shank when it is desired.

In the modification shown in Figures 5 and 6, the head members 14 and 15 are parallel to each other and the member 15 has a plurality of slots 28, 28 whereby a plurality of resilient leaves are formed allowing the ring 18 to pass through the opening 27 and be retained therein free from accidental withdrawal.

In the modification shown in Figures 7 and 8, the inner faces of the two head members are parallel to each other.

It will thus be seen that the two heads can be moved together by telescoping the shank elements and that the insertion of the ring, or flange, of the member 16 within the opening of the member 15 will hold these two head members from accidental movement from each other while allowing that movement when desired.

I do not limit myself to the particular size, shape, number or arrangement of parts, as shown and described, as these are given simply as a means for clearly describing my invention.

What I claim is:—

1. In an extensible cuff-link, in combination, a plurality of telescopic members, a link head carried by the extremity of the outer telescopic member, a flange carried by the other extremity of the outer telescopic member, a link head carried by the extremity of the inner telescopic member having a recess therein capable of receiving the said flange when the telescopic members are in closed position and means for retaining the flange within the recess.

2. In an extensible cuff-link, in combination, a plurality of telescopic members, a link head carried by the extremity of the outer telescopic member, a flange carried by the other extremity of the outer telescopic member, a link head carried by the extremity of the inner telescopic member having a recess therein capable of receiving the said flange when the telescopic members are in closed position, the flange being of such size as to be removable from the recess only by considerable force and means for retaining the flange within the recess.

3. In an extensible cuff-link, in combination, a plurality of telescopic members, a link head carried by the extremity of the outer telescopic member in non-rectangular position thereto, a flange carried by the outer extremity of the outer telescopic member, a link head carried by the extremity of the inner telescopic member in non-rectangular position thereto and having a recess therein capable of receiving the said flange when the telescopic members are in closed position, the angular position of the said flange to said recess being such as to retain the flange within the recess.

Signed at New York City, in the county of New York and State of New York, this 23rd day of January, 1925.

JOSEPH TANNENBAUM.